(12) United States Patent
Lu (10) Patent No.: US 10,404,578 B2
(45) Date of Patent: Sep. 3, 2019

(54) METHOD FOR CALLING ROUTING ALGORITHM, SDN CONTROLLER, AND SDN-OAF

(71) Applicant: ZTE CORPORATION, Shenzhen, Guangdong Province (CN)

(72) Inventor: Gang Lu, Shenzhen (CN)

(73) Assignee: ZTE CORPORATION (CN)

( * ) Notice: Subject to any disclaimer, the term of this patent is extended or adjusted under 35 U.S.C. 154(b) by 168 days.

(21) Appl. No.: 15/525,075

(22) PCT Filed: Jul. 24, 2015

(86) PCT No.: PCT/CN2015/085065
§ 371 (c)(1),
(2) Date: May 8, 2017

(87) PCT Pub. No.: WO2016/074499
PCT Pub. Date: May 19, 2016

(65) Prior Publication Data
US 2017/0324649 A1 Nov. 9, 2017

(30) Foreign Application Priority Data
Nov. 11, 2014 (CN) .......................... 2014 1 0632701

(51) Int. Cl.
*H04L 12/721* (2013.01)
*H04L 29/08* (2006.01)
*H04L 12/28* (2006.01)
*H04L 12/715* (2013.01)

(52) U.S. Cl.
CPC .............. *H04L 45/14* (2013.01); *H04L 12/28* (2013.01); *H04L 29/08081* (2013.01); *H04L 45/04* (2013.01); *H04L 45/64* (2013.01)

(58) Field of Classification Search
CPC ... H04L 12/28; H04L 29/08081; H04L 45/04; H04L 45/14; H04L 45/64
See application file for complete search history.

(56) References Cited

U.S. PATENT DOCUMENTS

| | | | | |
|---|---|---|---|---|
| 9,450,817 B1 * | 9/2016 | Bahadur | ................. | H04L 45/64 |
| 9,634,867 B2 * | 4/2017 | Lee | ..................... | H04L 12/6418 |
| 9,819,540 B1 * | 11/2017 | Bahadur | ................. | H04L 45/64 |
| 2015/0103844 A1 * | 4/2015 | Zhao | ...................... | H04L 45/42 |
| | | | | 370/410 |

(Continued)

FOREIGN PATENT DOCUMENTS

| | | |
|---|---|---|
| CN | 103338163 A | 10/2013 |
| CN | 103346922 A | 10/2013 |
| CN | 103475722 A | 12/2013 |

(Continued)

*Primary Examiner* — Philip J Chea
*Assistant Examiner* — Ruth Solomon
(74) *Attorney, Agent, or Firm* — McDonald Hopkins LLC (57) ABSTRACT

The document discloses a method for invoking a routing algorithm, an SDN-OAF, and an SDN controller. The method includes pre-configuring a customized routing algorithm; an SDN controller receiving a path computation request from an application, invoking a corresponding customized routing algorithm according to information about the customized routing algorithm carried in the path computation request to compute a service path.

16 Claims, 3 Drawing Sheets

(56) References Cited

U.S. PATENT DOCUMENTS

2015/0319078 A1* 11/2015 Lee .................... H04L 12/6418
    370/392
2016/0205071 A1* 7/2016 Cooper ............... H04L 12/6418
    726/1

FOREIGN PATENT DOCUMENTS

| CN | 104009871 A | 8/2014 |
|---|---|---|
| CN | 104104718 A | 10/2014 |
| EP | 2680540 A1 | 1/2014 |
| EP | 2747354 A1 | 6/2014 |

* cited by examiner

Prior Art

METHOD FOR CALLING ROUTING ALGORITHM, SDN CONTROLLER, AND SDN-OAF

TECHNICAL FIELD

The present application relates to, but is not limited to, Software Defined Network (SDN) technology.

BACKGROUND

Software Defined Network (SDN) is a new network innovation architecture that builds an open and programmable network architecture by decoupling network control from network forwarding. SDN abstracts the network to shield the underlying complexity and provides simple, efficient configuration and management for the upper layer. Among them, the SDN in a narrow sense refers to a network of the southbound interface based on the OpenFlow protocol, while the SDN in a broad sense refers to all the networks with that concept.

Figure 1:
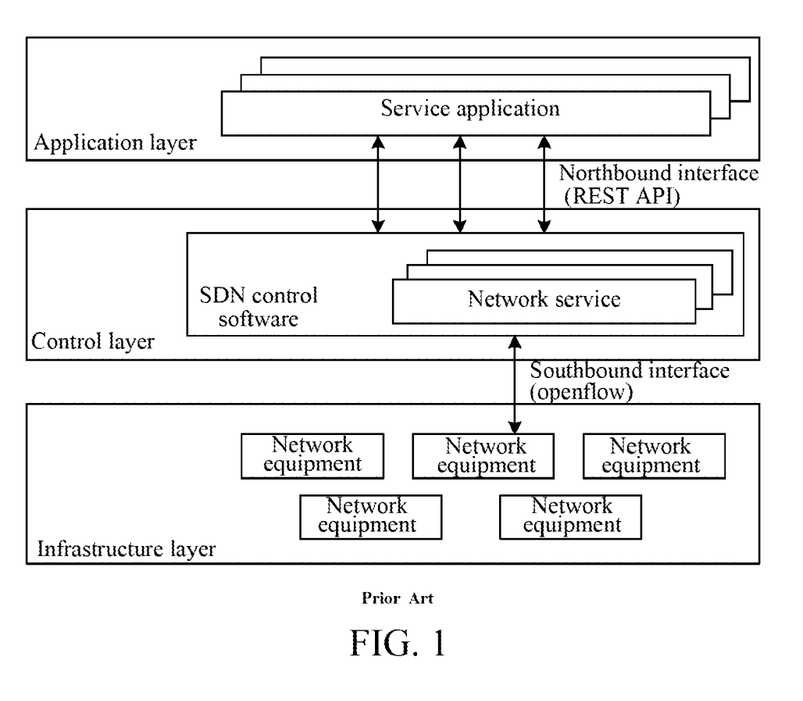
FIG. 1 is a schematic diagram of an architecture of an SDN in the existing technology.

The Open Networking Foundation (ONF) proposes and advocates an SDN network based on the OpenFlow protocol. FIG. 1 is a schematic diagram of an architecture of the SDN proposed by the ONF in the existing technology. As shown in FIG. 1, the SDN generally includes an application layer, a control layer and an infrastructure layer. Herein, the upper layer is the application layer, including various services and applications; and the control layer in the middle is mainly responsible for dealing with orchestration of data plane resource, maintenance of network topology and state information, etc.; and the lowest layer is the infrastructure layer and mainly responsible for data processing, forwarding and status collection. The interface between the control layer and the infrastructure layer is called the southbound interface which uses the OpenFlow protocol defined by ONF. The interface between the application layer and the control layer is called the northbound interface, which generally uses the Hypertext Transfer Protocol (HTTP) of the Representational State Transfer (REST) Application Program Interface (API) at present.

ONF also proposes a concept of multi-layer SDN, that is, there is more than one layer, i.e. multiple layers, for the SDN controller. Herein, it can be simply understood as single-domain SDN controller and multi-domain SDN controller. Of course, the multi-domain SDN controller may also have an upper SDN controller.

For the SDN controller, the Optical Internetworking Forum (OIF) proposes the northbound interface, that is, an interface definition framework for the REST API, which includes a call request application program interface (Call Request API), a connection request application program interface (Connection Request API), a directory services application program interface (Directory Services API), a path computation application program interface (Path Computation API), a topology database application program interface (Topology DB API), and so on. Among them, the interfaces use a JavaScript Object Notation (JSON) format to represent the attributes and values of the interfaces. In the OIF, the northbound interface defines only an attribute necessary for basic path computation.

In an architecture of the SDN in the existing technology, the SDN controller includes modules for path computation, topology abstraction, flow table management, link discovery, and so on. For the SDN controller, its advantage is flexible and open control, and a routing algorithm in the SDN controller directly determines to a great extent whether a final established service path meets the requirement of users. At present, there is no customized capability in routing algorithm part of the SDN controller, and algorithms implemented by different manufacturers are different. In general, some default routing algorithms can deal with the basic requirements, but when a requirement for path computation of an application (APP) is various and special, multiple fixed common routing algorithms can not meet the requirements of users. In response to that situation, service providers need to provide a way for the APP to customizing a routing algorithm, such that the APP can select a desired routing algorithm, and the routing algorithm can increase, update continuously to cope with customized requirements of the SDN for service path computation. From the view of current SDN standard and part of commercialized systems, the routing algorithm part is still closed and not open, thus greatly restricting the requirements of the users for the service path.

On the other hand, for the SDN network, the original routing algorithms need to be improved for large-scale networking. At present, some manufacturers have proposed an intelligent flow engine built in the SDN controller, which combines technologies, such as graph theory, linear programming and matrix compression etc. to reduce a global optimization computation time for an SDN large-scale network. It can be expected that an equipment manufacturer will introduce a corresponding private routing algorithm for the SDN network, into the SDN controller later. However, considering the introduction of SDN multi-domain controller, it involves coordination of multiple SDN single-domain controllers for path computation by an SDN multi-domain controller, since different SDN single-domain controllers may be provided by different manufacturers, there is a case where routing algorithms of different manufacturers are not compatible with each other. The higher the degree of privatization is, the more difficult the interworking is. That is especially obvious for the SDN network, due to the openness of the SDN, more SDN controllers from different manufacturers will be networked in a hybrid mode, interworking capability and compatibility problems will directly affect actual service processing capability of the SDN network.

SUMMARY

A summary of the subject matter described in detail in the document is given below. The summary is not intended to limit the scope of the claims.

The document provides a method for invoking a routing algorithm and SDN controller and SDN-OAF, which can provide a customized routing algorithm for an APP, such that the routing algorithm part is opened, to better meet requirements of users.

A method for invoking a routing algorithm includes pre-configuring a customized routing algorithm is provided, and further includes: a software defined network (SDN) controller receives a routing computation request from an application APP;

the SDN controller invokes a corresponding customized routing algorithm according to information about the customized routing algorithm carried in the path computation request to compute a service path.

In an exemplary embodiment, before the software defined network (SDN) controller receives a path computation request from an application, the method further includes: the APP acquires the information about the customized routing algorithm before a service is established.

In an exemplary embodiment, that the APP acquires the information about the customized routing algorithm includes:

the APP transmits a query request to an SDN Open Algorithm Function, SDN-OAF, and the SDN-OAF provides the customized routing algorithm for the APP to query, and returns a URL address of a customized routing algorithm which is selected by the APP as the information about the customized routing algorithm to the APP.

In an exemplary embodiment, the method further includes: the SDN-OAF performs an authentication on a user of the APP requesting to query; only when the authentication succeeds, the SDN-OAF performs the step of selecting the customized routing algorithm; and when the authentication fails, the SDN-OAF rejects the query request of the APP.

In an exemplary embodiment, that the SDN controller invokes a corresponding customized routing algorithm according to information about the customized routing algorithm carried in the path computation request includes:

the SDN controller downloads a library file corresponding to the customized routing algorithm from the SDN-OAF according to a URL address of the customized routing algorithm carried in the path computation request, and loads the library file corresponding to the customized routing algorithm locally;

the SDN controller invokes a customized routing algorithm function which is downloaded, by using a universal invoking interface for a routing algorithm, and performs computation of the service path this time.

In an exemplary embodiment, the SDN controller is a single-domain SDN controller; or the SDN controller is a multi-domain SDN controller, and algorithm customization is performed with the multi-domain SDN controller.

In an exemplary embodiment, the SDN controller is a multi-domain SDN controller, and algorithm customization is performed with one or more single-domain SDN controllers under administration of the multi-domain SDN controller;

that the SDN controller invokes a corresponding customized routing algorithm according to information about the customized routing algorithm carried in the path computation request includes:

the multi-domain SDN controller acquires the URL address of the customized routing algorithm carried in the path computation request according to the path computation request which is received from the APP, and issuing the URL address of the customized routing algorithm carried in the path computation request to a single-domain SDN controller under administration of the multi-domain SDN controller;

the single-domain SDN controller downloads a library file corresponding to the customized routing algorithm from an SDN-OAF, and loads the library file corresponding to the customized routing algorithm locally;

the single-domain SDN controller invokes the customized routing algorithm function which is downloaded to perform a path cooperative computation across multiple domains by using a universal invoking interface for a routing algorithm.

In an exemplary embodiment, before downloading the library file corresponding to the customized routing algorithm, the method further includes:

the SDN-OAF performs an authentication on the SDN controller, and continues to perform the step of downloading the library file corresponding to the customized routing algorithm when the authentication succeeds.

In an exemplary embodiment, after the SDN controller receives the path computation request from the application, APP, the method further includes:

the SDN controller determines whether the path computation request carries the URL address of the customized routing algorithm, and when the URL address of the customized routing algorithm is not carried, the SDN controller invokes a preset default routing algorithm to compute the service path.

In an exemplary embodiment, when the SDN controller fails to download the library file corresponding to the customized routing algorithm from the SDN-OAF, the method further includes:

the SDN controller invokes a preset default routing algorithm to compute the service path.

In an exemplary embodiment, after computing the service path, the method further includes: the SDN controller deletes or caches a library file of the customized routing algorithm acquired this time according to a setting.

A software defined network, SDN, controller includes an adaptation module, a downloading module, and an invoking module.

The adaptation module is configured to receive a path computation request and determine whether the path computation request carries a URL address of a customized routing algorithm and transmit a first notification to the invoking module when the URL address of the customized routing algorithm is not carried; and output the URL address of the customized routing algorithm to the downloading module when the URL address of the customized routing algorithm is carried.

The downloading module is configured to download a library file corresponding to the customized routing algorithm from an SDN Open Algorithm Function (SDN-OAF) according to the received URL address of the customized routing algorithm, load the library file corresponding to the customized routing algorithm, and output a second notification to the invoking module.

The invoking module invokes a preset default routing algorithm to compute a service path when receiving the first notification; and invokes a customized routing algorithm function which is downloaded by using a universal invoking interface for a routing algorithm, and perform computation of the service path this time when receiving the second notification.

In an exemplary embodiment, the downloading module is further configured to transmit a first notification to the invoking module when failing to download the library file corresponding to the customized routing algorithm.

In an exemplary embodiment, the downloading module is further configured to delete or cache the library file for the customized routing algorithm acquired this time.

In an exemplary embodiment, the downloading module is further configured to determine whether the library file corresponding to the URL address of the customized routing algorithm is cached; and output a third notification to the invoking module when the library file is cached; and continue to download the library file when the library file is not cached.

The invoking module is further configured to invoke the cached customized routing algorithm to compute the service path when receiving the third notification.

A software defined network Open Algorithm Function (SDN-OAF) includes a query module, a download processing module, and a customized routing algorithm storage module storing a pre-configured customized routing algorithm.

The query module is configured to receive a query request from an APP, decide a customized routing algorithm according to a requirement for current service establishment, and select the customized routing algorithm from the customized routing algorithm storage module, and return a URL address of the selected customized routing algorithm as information about the customized routing algorithm to the APP.

The download processing module is configured to receive a download request from an SDN controller, and acquire a corresponding library file from the customized routing algorithm storage module according to the URL address of the customized routing algorithm carried in the download request and return the corresponding library file to the SDN controller.

In an exemplary embodiment, the SDN-OAF further includes a first authentication module, which is configured to perform an authentication on a user of the APP requesting to query; and forward the query request to the query module when the authentication succeeds; and reject the query request this time when the authentication fails.

In an exemplary embodiment, the SDF-OAF further includes a second authentication module, which is configured to perform an authentication on the SDN controller which initiates the download request, and forward the download request to the download processing module when the authentication succeeds; and reject the download request this time when the authentication fails.

A computer-readable storage medium storing computer-executable instructions, and the computer-executable instructions are used to execute any of the abovementioned methods.

Compared to the existing technology, the technical scheme of the application includes pre-configuring a customized routing algorithm; an SDN controller receiving a path computation request from an application, invoking a corresponding customized routing algorithm according to information about the customized routing algorithm carried in the path computation request to compute a service path. Embodiments of the invention provide better openness of the routing algorithm by the preset customized routing algorithm, such that the routing algorithm part is opened, to better meet the requirement of the users. Moreover, in embodiments of the invention, the SDN controller downloads the customized routing algorithm locally by itself, and then invokes the customized routing algorithm for path computation, which provides a high flexibility for path computation of the SDN network, and better adapts to various user service establishment requirements in the SDN network.

After reading and understanding the drawings and detailed description, other aspects can be understood.

DETAILED DESCRIPTION

The embodiments of the present document will be described in detail below in conjunction with accompanying drawings. It should be illustrated that, under the situation of no conflict, the embodiments and the features in the embodiments in the present application can be freely combined with each other.

Figure 2:
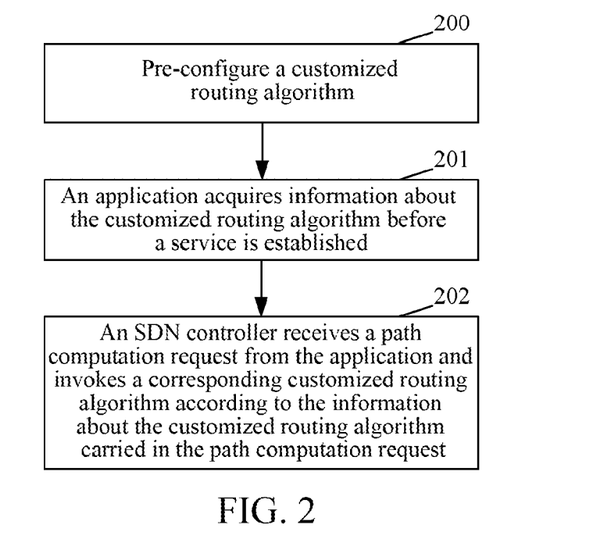
FIG. 2 is a flow chart of a method for invoking a routing algorithm according to an embodiment of the present disclosure.

FIG. 2 is a flow chart of a method for invoking a routing algorithm according to an embodiment of the present disclosure. As shown in the FIG. 2, the method includes the following steps 200-202.

In step 200, a customized routing algorithm is pre-configured.

The customized routing algorithm in this step is a verified and reliable routing algorithm provided by a service provider. That is, reliability and interworking tests of the customized routing algorithm involved in the embodiment of the present disclosure have been completed in advance, which ensures that the customized routing algorithm can be used in each SDN controller in a network of the service provider.

In this step, the customized routing algorithm which is configured may be stored in the SDN Open Algorithm Function (SDN-OAF) as a customized routing algorithm function. Here, SDN-OAF may be integrated in a network management platform of an existing service provider, and may also be integrated in other authoritative third-party equipment. The security and reliability of the SDN-OAF are guaranteed by the network of the service provider or other authoritative third-party networks. In an exemplary embodiment, the SDN-OAF is integrated into the network management platform of the service provider. A network administrator may configure the customized routing algorithm into the SDN-OAF in a form of a library file.

In this step, by customizing and updating the routing algorithm in the SDN-OAF, better openness of the routing algorithm is provided, which makes the routing algorithm partially open, to better meet requirements of users.

In step 201, an application acquires information about the customized routing algorithm before a service is established. The step includes:

an APP transmits a query request to the SDN-OAF, and the SDN-OAF provides a list of all customized routing algorithms which are currently selectable for the APP to select; after the APP selects a customized routing algorithm, the SDN-OAF returns a URL address of the selected customized routing algorithm to the APP as the information about the customized routing algorithm. Herein, a message protocol for the query request is not limited, and a protocol, such as HTTP, File Transfer Protocol (FTP), or other protocol may be used.

There may be one or more customized routing algorithms acquired in this step, and accordingly, There may be one or more returned URL addresses. When two or more customized routing algorithms are acquired, multiple customized routing algorithms will be used in combination.

This step may also include: an authentication is performed on a user of the APP requesting the query, for example, a user name and password for the query are carried in the query request, and the SDN-OAF also performs an authentication on the user name and password; and the step of selecting the customized routing algorithm is performed only after the authentication succeeds; otherwise, the query request of the APP is rejected, and the flow ends.

In step 202, the SDN controller receives a path computation request from the application and invokes the corresponding customized routing algorithm according to the information about the customized routing algorithm carried in the path computation request to compute a service path.

The step includes that:

the APP transmits a path computation request to the SDN controller, and in the path computation request, an acquired URL address of the customized routing algorithm used for the current service computation is carried; the SDN controller downloads a library file corresponding to the customized routing algorithm from the SDN-OAF according to the URL address of the customized routing algorithm carried in the path computation request, and loads the library file of the customized routing algorithm locally; the SDN controller invokes the customized routing algorithm function which is downloaded by using a universal invoking interface for a routing algorithm, and performs computation of the service path this time.

The SDN controller includes a universal algorithm interface for an algorithm library of the SDN-OAF which supports invoking of the customized routing algorithm downloaded from the SDN-OAF. The SDN controller and the SDN-OAF are connected through a northbound interface, and an attribute of the URL address of the customized routing algorithm is extended in the path computation request transmitted through the northbound interface of the SDN controller, which is denoted as "oafAlgorithm": "<URL>". Herein, the URL is a URL address of the library file for the customized routing algorithm on the SDN-OAF, and the URL may carry one or more URL addresses of the library files of the customized routing algorithms. If there are a plurality of URL addresses, each URL address may be separated by ";".

Herein, a default message protocol used by the SDN controller to download the library file of the customized routing algorithm from the SDN-OAF is FTP, or may also be other protocols, which is not limited.

To ensure the universality, a unified function invoking interface is used for the invoking interface for the routing algorithm to invoke the algorithm function. Herein, the function invoking interface may be used to set and read the following parameters, including but not limited to: a source node, a destination node, a bandwidth, a service level, a topology, a routing policy, and so on. The function invoking interface may also be used to invoke methods below, including, but not limited to, a processing method before algorithm execution, a processing method for algorithm execution, a processing method after algorithm execution, and the like. After the abovementioned function invoking interface is unified, the function implementation in the function invoking interface is completed by the provider of each customized algorithm. Only these universal invoking interfaces for the routing algorithm are used in the SDN controller to invoke the algorithm function, thus ensuring the universality of the interfaces.

Before downloading the library file corresponding to the customized routing algorithm, this step may further include: the SDN-OAF performs an authentication on the SDN controller. Only if the authentication succeeds, the library file corresponding to the customized routing algorithm is allowed to be downloaded. Otherwise, the flow will be ended. There are many manners for authentication, such as authentication by a locally configured user name/password, or HTTP Digest MD5, or other authentication manners.

The step further includes: the SDN controller determines whether the path computation request carries the URL address of the customized routing algorithm; if the URL address of the customized routing algorithm is not carried, a preset default routing algorithm is invoked to compute the service path; and the flow ends.

If the SDN controller fails to download the library file corresponding to the customized routing algorithm from the SDN-OAF, the step further includes: the SDN controller invokes the preset default routing algorithm to compute the service path; and the flow ends.

In step 202, the SDN controller is a single-domain SDN controller.

Or, in step 202, the SDN controller is a multi-domain SDN controller. At this moment, if the multi-domain SDN controller is used to perform an embodiment of algorithm customization, the SDN controllers in step 202 are all multi-domain SDN controllers.

At this moment, if one or more single-domain SDN controllers under the administration of the multi-domain SDN controller are used to perform an embodiment of algorithm customization, the step 202 includes:

the APP transmits a path computation request to the multi-domain SDN controller, and in the path computation request, an acquired URL address of the customized routing algorithm used for the current service computation is carried; the multi-domain SDN controller acquires the URL address of the customized routing algorithm carried in the path computation request, and transmits the URL address of the customized routing algorithm carried in the path computation request to the single-domain SDN controller under the administration of the multi-domain SDN controller; each single-domain SDN controller downloads a library file corresponding to the customized routing algorithm from the SDN-OAF and loads the library file corresponding to the customized routing algorithm locally; each single-domain SDN controller invokes the customized routing algorithm function which is downloaded to perform a path cooperative computation across multiple domains by using the universal invoking interface for the routing algorithm. Herein, the step of the path computation is depended on the different customized routing algorithms, and a main path computation processing is realized by the provider of the customized routing algorithm in the invoking interface for the routing algorithm.

As can be seen from the step, in the method according to the embodiment of the present disclosure, when the path computation request is transmitted, the URL address of the library file of the specified customized routing algorithm is carried, and the SDN controller downloads the library file locally by itself, and then invokes the customized routing algorithm to perform the path computation, which provides a high flexibility for path computation of the SDN network, and better adapts to various user service establishment requirements in the SDN network.

After computation of the service path this time is completed according to the customized routing algorithm which is acquired, the method may further include:

the SDN controller may immediately delete, or cache the library file for the customized routing algorithm which is acquired this time according to a setting. If the library file for the customized routing algorithm which is acquired this time is deleted immediately, then the SDN controller still needs to re-download the corresponding library file from the SDN-OAF if the same customized routing algorithm is specified in a next service path computation request, and invokes the customized routing algorithm for computation of the service path. If a library file of the customized routing algorithm library which is acquired this time is cached, then the SDN controller may directly invoke the cached library file for computation of the service path if the same customized routing algorithm is specified in a next service path computation request.

Figure 3:
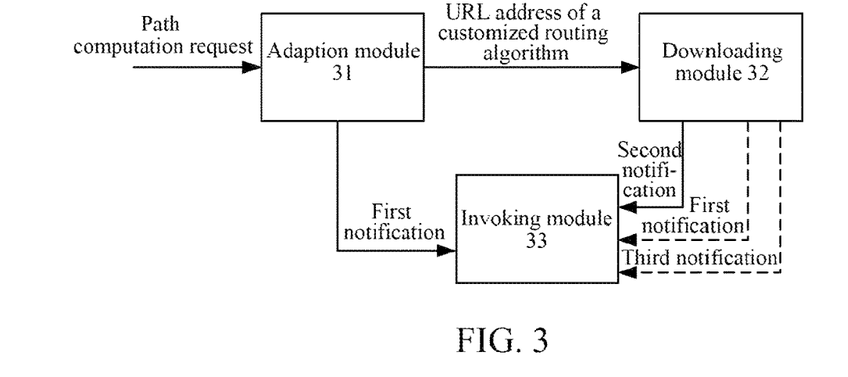
FIG. 3 is a schematic diagram of a structure of an SDN controller according to an embodiment of the present disclosure.

FIG. 3 is a schematic diagram of a structure of an SDN controller according to an embodiment of the present disclosure. The SDN controller includes an adaptation module 31, a downloading module 32, and an invoking module 33 as shown in FIG. 3.

The adaptation module 31 is configured to receive a path computation request and determine whether the path computation request carries a URL address of a customized routing algorithm; if the URL address is not carried, transmit a first notification to the invoking module 33; and if the URL address of the customized routing algorithm is carried, output the URL address of the customized routing algorithm to the downloading module 32.

The downloading module 32 is configured to download a library file corresponding to the customized routing algorithm from the SDN-OAF according to the URL address of the received customized routing algorithm, and load the library file corresponding to the customized routing algorithm, and output a second notification to the invoking module 33.

The invoking module 33 invokes a preset default routing algorithm to compute a service path when receiving the first notification; and invokes a customized routing algorithm function which is downloaded, performs computation of the service path this time by using a universal invoking interface for a routing algorithm when receiving the second notification.

The downloading module 32 is further configured to transmit the first notification to the invoking module 33 when failing to download the library file corresponding to the customized routing algorithm.

The downloading module 32 is further configured to immediately delete, or cache the library file for the customized routing algorithm acquired this time.

The downloading module 32 is further configured to determine whether the library file corresponding to the URL address of the customized routing algorithm is cached, and output a third notification to the invoking module 33 if the library file is cached; and continue to download the library file if the library file is not cached.

The invoking module 33 is further configured to invoke the cached customized routing algorithm to compute the service path when receiving the third notification.

Figure 4:
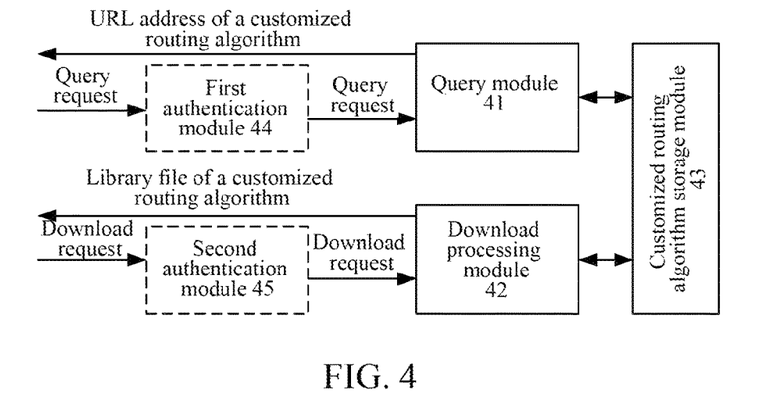
FIG. 4 is a schematic diagram of a structure of an SDN-OAF according to an embodiment of the present disclosure.

FIG. 4 is a schematic diagram of a structure of an SDN-OAF according to an embodiment of the present disclosure. The SDN-OAF includes a query module 41, a download processing module 42, and a customized routing algorithm storage module 43 storing a customized routing algorithm which is pre-configured, as shown in FIG. 4.

The query module 41 is configured to receive a query request from an APP, and decide a customized routing algorithm according to a requirement for current service establishment to select the customized routing algorithm from the customized routing algorithm storage module 43, and return a URL address of the selected customized routing algorithm as information about the customized routing algorithm to the APP.

The download processing module 42 is configured to receive a download request from the SDN controller, and obtain a corresponding library file from the customized routing algorithm storage module 43 and return to the SDN controller according to the URL address of the customized routing algorithm carried in the download request.

The SDN-OAF according to an embodiment of the present disclosure further includes a first authentication module 44, which is configured to perform an authentication on a user of the APP requesting to query, and if the authentication succeeds, forward the query request to the query module 41; if the authentication fails, reject the query request this time.

The SDN-OAF according to an embodiment of the present disclosure further includes a second authentication module 45, which is configured to perform an authentication on an SDN controller which initiates a download request, and if the authentication succeeds, forward the download request to the download processing module 42; if the authentication fails, reject the download request this time.

Hereinafter, in conjunction with the embodiments, the present disclosure will be described in detail.

Figure 5:
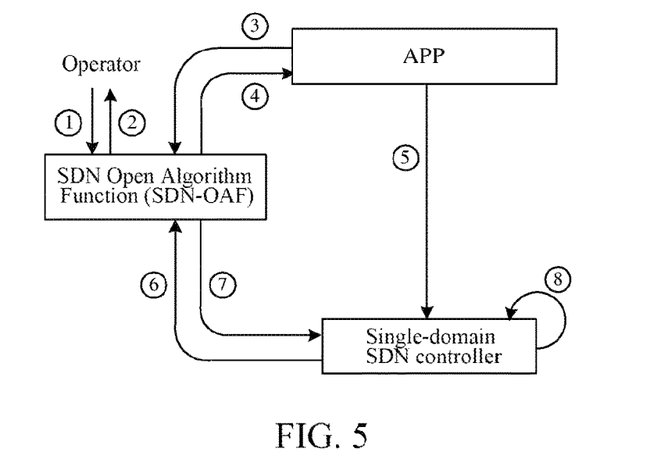
FIG. 5 is a schematic diagram of a first embodiment for invoking a routing algorithm in the present disclosure.

FIG. 5 is a schematic diagram of a first embodiment for invoking a routing algorithm in the present disclosure, and the first embodiment is an embodiment in a single-domain SDN controller environment. As shown in FIG. 5, routing algorithm customization is performed directly on a single-domain SDN controller by an APP. In the first embodiment, it is assumed that the URL address of the SDN-OAF is: http://xxx-sdn-oaf/server1, and a name of a specified algorithm library is a.lib; a URL address of the single-domain SDN controller is: http://controller1.example.com. As shown in FIG. 5, it is assumed that ① an operator of a service provider has configured the a.lib of the customized routing algorithm into the SDN-OAF of the network management platform, and ② the SDN-OAF may return a success response to the operator after the a.lib of the customized routing algorithm is successfully configured.

③ The APP initiates a query request to SDN-OAF to query an available customized routing algorithm.

④ In this embodiment, it is assumed that the a.lib of the customized routing algorithm satisfies a requirement for current service establishment, then the SDN-OAF returns a response message to the APP, which includes the URL address of the a.lib: http://xxx-sdn-Oaf/server1/a.lib.

⑤ The APP may use the existing Path Computation REST API as a path computation request to request the single-domain SDN controller for path computation, and a URL address of the specified routing algorithm library, a.lib, is carried in the path computation request.

⑥ The single-domain SDN controller requests the SDN-OAF for downloading the specified algorithm library, that is, http://xxx-sdn-oaf/server1/a.lib.

⑦ The SDN-OAF returns the a.lib to a single-domain SDN controller.

⑧ The single-domain SDN controller loads the acquired a.lib locally, and use the routing algorithm to perform computation of the path this time.

Figure 6:
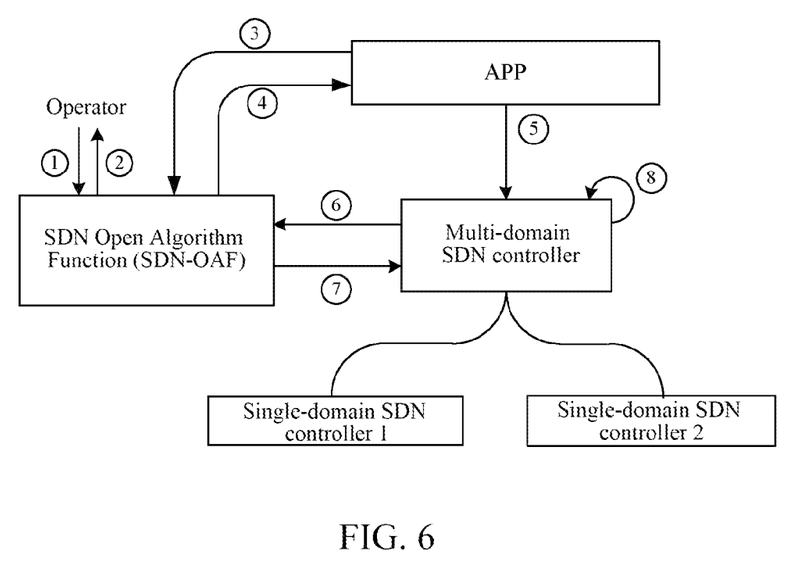
FIG. 6 is a schematic diagram of a second embodiment for invoking a routing algorithm in the present disclosure.

FIG. 6 is a schematic diagram of a second embodiment for invoking a routing algorithm in the present disclosure, and the second embodiment is an embodiment in which a multi-domain SDN controller performs algorithm customization in a multi-domain SDN controller environment. As shown in FIG. 6, algorithm customization is performed directly on a multi-domain SDN controller by an APP. In the second embodiment, it is assumed that a URL address of the SDN-OAF is: http://xxx-sdn-oaf/server1, and a name of a specified algorithm library is a.lib; and a URL address of the multi-domain SDN controller is: http://multi-controller.example.com. As shown in FIG. 6, it is assumed that ① an operator of an service provider has configured the a.lib of the customized routing algorithm into the SDN-OAF of the network management platform, and ② the SDN-OAF may return a success response to the operator after the a.lib of the customized routing algorithm is successfully configured.

③ The APP initiates a query request to SDN-OAF to query an available customized routing algorithm.

④ In the embodiment, it is assumed that the a.lib of the customized routing algorithm satisfies a requirement for current service establishment, then the SDN-OAF returns a response message to the APP, which includes the URL address of the a.lib: http://xxx-sdn-Oaf/server1/a.lib.

⑤ The APP may use the existing Path Computation REST API as a path computation request to request the multi-domain SDN controller for path computation, and the URL address of the specified routing algorithm library, a.lib, is carried in the path computation request.

⑥ The multi-domain SDN controller requests the SDN-OAF for downloading the specified algorithm library, that is, http://xxx-sdn-oaf/server1/a.lib.

⑦ The SDN-OAF returns the a.lib to the multi-domain SDN controller.

⑧ The multi-domain SDN controller loads the acquired a.lib locally, and uses the routing algorithm to perform computation of the path this time.

Figure 7:
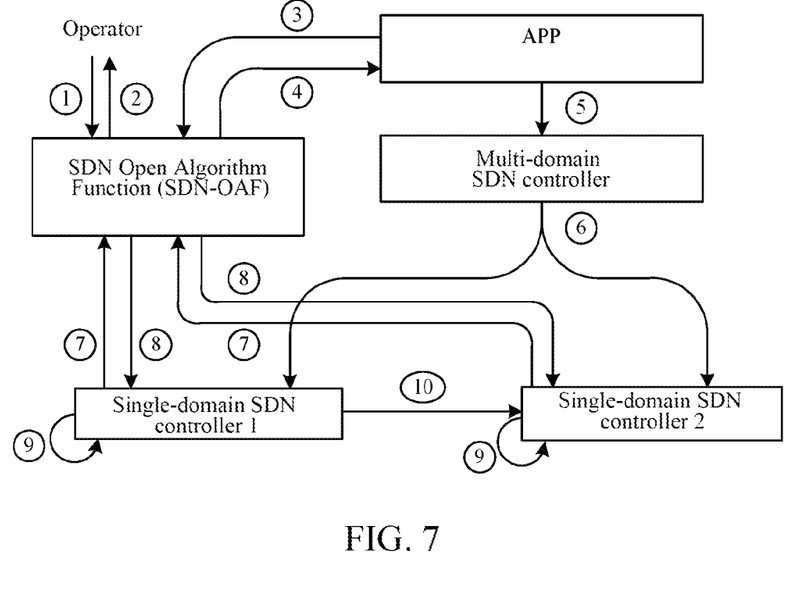
FIG. 7 is a schematic diagram of a third embodiment for invoking a routing algorithm in the present disclosure.

FIG. 7 is a schematic diagram of a third embodiment for invoking a routing algorithm in the present disclosure, and the third embodiment is an embodiment in which a multi-domain SDN controller performs algorithm customization in a multi-domain SDN controller environment. The APP needs to compute a path from a node A in an SDN controller 1 to a node B in an SDN controller 2, that is, a cross-domain path. As shown in FIG. 7, the APP performs, through a multi-domain SDN controller, algorithm customization on single-domain SDN controllers, such as a single-domain SDN controller 1 and a single-domain SDN controller 2. In the third embodiment, it is assumed that a URL address of an SDN-OAF is: http://xxx-sdn-oaf/server1, and a name of a specified algorithm library is a.lib; a URL address of the multi-domain SDN controller is: http://multi-controller.example.com, and a URL address of the single-domain SDN controller 1 is: http://controller1.example.com, and the URL address of the single-domain SDN controller 2 is: http://controller2.example.com. As shown in FIG. 7, it is assumed that ① an operator of an service provider has configured the a.lib of the customized routing algorithm into the SDN-OAF of the network management platform, and ② the SDN-OAF may return a success response to the operator after the a.lib of the customized routing algorithm is successfully configured.

③ The APP initiates a query request to SDN-OAF to query an available customized routing algorithm.

④ In the embodiment, it is assumed that the a.lib of the customized routing algorithm satisfies a requirement for current service establishment, then the SDN-OAF returns a response message to the APP, which includes the URL address of the a.lib: http://xxx-sdn-Oaf/server1/a.lib.

⑤ The APP may use an existing Path Computation REST API as a path computation request to request the multi-domain SDN controller for path computation, and a URL address of the specified routing algorithm library, the a.lib, is carried in the path computation request.

⑥ The multi-domain SDN controller transmits the URL address of the specified algorithm library to the single-domain controller 1 and the single-domain controller 2 through the existing REST API.

⑦ The single-domain controller 1 and the single-domain controller 2 use authentication manner which has been configured locally, such as a user name or password on the SDN-OAF, to request the SDN-OAF for downloading the specified algorithm library, according to a URL address of an algorithm library carried in oafAlgorithm of the existing REST API, that is, http://xxx-sdn-oaf/server1/a.lib.

⑧ The SDN-OAF performs an authentication on the user name and the password, and when the user name and the password pass the authentication successfully, returns the corresponding library file, a.lib, to the single-domain SDN controller 1 and the single-domain SDN controller 2.

⑨ When receiving the a.lib, the single-domain SDN controller 1 and single-domain SDN controller 2 load the a.lib into respective local customized algorithm libraries of the SDN controllers, respectively.

⑩ The single-domain SDN controller 1 and the single-domain SDN controller 2 begin to cooperate with each other to complete computation of a multi-domain path.

Those ordinarily skilled in the art can understand that all or some of the steps of the abovementioned embodiments may be implemented by using a computer program process, and the computer program may be stored in a computer-readable storage medium. The computer program may be executed on an appropriate hardware platform (such as a system, equipment, device, component, and so on), and during the execution, it includes one of the steps of the method embodiment or a combination thereof.

All or some of the steps of the abovementioned embodiments may also be implemented with integrated circuits, and these steps may be made into individual integrated circuit modules respectively, or some of the modules or steps can be made into a single integrated circuit module to implement.

Various devices/functional modules/functional units in the abovementioned embodiments may be implemented with universal computing devices, and they may be concentrated on a single computing device or distributed on a network composed of a plurality of computing devices.

When various devices/functional modules/functional units in the abovementioned embodiments are implemented in the form of software functional module and sold or used as individual products, they may be stored in a computer readable storage medium. The abovementioned computer-readable storage medium may be a read-only memory, magnetic or optical disk, and the like.

INDUSTRIAL APPLICABILITY

The embodiments of the invention provide better openness of the routing algorithm by the preset customized routing algorithm, such that the routing algorithm part is opened, to better meet the requirement of the users. Moreover, in the embodiments of the invention, the SDN controller itself downloads the customized routing algorithm from an SDN-OAF locally, and then invokes the customized routing algorithm for path computation, which provides a high flexibility for path computation of the SDN network and better adapts to various user service establishment requirements in the SDN network.

What is claimed is:
1. A method for invoking a routing algorithm, comprising: pre-configuring a customized routing algorithm, and further comprising: a software defined network, SDN, controller receiving a path computation request from an application, APP;

the SDN controller invoking a corresponding customized routing algorithm according to information about the customized routing algorithm carried in the path computation request to compute a service path; wherein, before the software defined network, SDN, controller receives the path computation request from the application, APP, the method further comprises: the APP acquiring the information about the customized routing algorithm before a service is established; wherein, the APP acquiring the information about the customized routing algorithm comprises:

the APP transmitting a query request to an SDN Open Algorithm Function, SDN-OAF, and the SDN-OAF providing the customized routing algorithm for the APP to query, and returning a Uniform Resource Locator, URL, address of a customized routing algorithm which is selected by the APP as the information about the customized routing algorithm to the APP.

2. The method according to claim 1, further comprising: the SDN-OAF performing an authentication on a user of the APP requesting to query; only when the authentication succeeds, providing the customized routing algorithm for the APP to query, and returning the URL address of the customized routing algorithm which is selected by the APP as the information about the customized routing algorithm to the APP; and when the authentication fails, rejecting the query request of the APP.

3. The method according to claim 1, wherein, the SDN controller invoking a corresponding customized routing algorithm according to information about the customized routing algorithm carried in the path computation request comprises:

the SDN controller downloading a library file corresponding to the customized routing algorithm from the SDN-OAF according to a URL address of the customized routing algorithm carried in the path computation request, and loading the library file corresponding to the customized routing algorithm locally;

the SDN controller invoking a customized routing algorithm function, which is downloaded, by using a universal invoking interface for a routing algorithm, and performing computation of the service path this time, and, wherein, the SDN controller is a single-domain SDN controller; or the SDN controller is a multi-domain SDN controller, and algorithm customization is performed with the multi-domain SDN controller.

4. The method according to claim 1, wherein, the SDN controller is a multi-domain SDN controller, and algorithm customization is performed with one or more single-domain SDN controllers under administration of the multi-domain SDN controller;

the SDN controller invoking a corresponding customized routing algorithm according to information about the customized routing algorithm carried in the path computation request comprises:

the multi-domain SDN controller acquiring a URL address of the customized routing algorithm carried in the path computation request according to the path computation request which is received from the APP, and issuing the URL address of the customized routing algorithm carried in the path computation request to the single-domain SDN controller under administration of the multi-domain SDN controller;

the single-domain SDN controller downloading a library file corresponding to the customized routing algorithm from an SDN-OAF, and loading the library file corresponding to the customized routing algorithm locally;

the single-domain SDN controller invoking the customized routing algorithm function which is downloaded to perform a path cooperative computation across multiple domains by using a universal invoking interface for a routing algorithm.

5. The method according to claim 3, wherein, before downloading the library file corresponding to the customized routing algorithm, the method further comprises:

the SDN-OAF performing an authentication on the SDN controller, and continuing to perform the step of downloading the library file corresponding to the customized routing algorithm when the authentication succeeds.

6. The method according to claim 3, wherein, after the SDN controller receives the path computation request from the application, APP, the method further comprises:

the SDN controller determining whether the path computation request carries the URL address of the customized routing algorithm, and when the URL address of the customized routing algorithm is not carried, invoking a preset default routing algorithm to compute the service path.

7. The method according to claim 3, wherein, when the SDN controller fails to download the library file corresponding to the customized routing algorithm from the SDN-OAF, the method further comprises:

the SDN controller invoking a preset default routing algorithm to compute the service path.

8. The method according to claim 3, wherein, after computing the service path, the method further comprises: the SDN controller deleting or caching a library file of the customized routing algorithm which is acquired this time according to a setting.

9. A software defined network, SDN, controller comprising hardware performing instructions stored in a non-transitory computer readable medium which executes steps in following modules: an adaptation module, a downloading module, and an invoking module; wherein, the adaptation module is configured to receive a path computation request and determine whether the path computation request carries a URL address of a customized routing algorithm; and transmit a first notification to the invoking module when the URL address of the customized routing algorithm is not carried; and output the URL address of the customized routing algorithm to the downloading module when the URL address of the customized routing algorithm is carried;

the downloading module is configured to download a library file corresponding to the customized routing algorithm from an SDN Open Algorithm Function, SDN-OAF, according to the received URL address of the customized routing algorithm, load the library file corresponding to the customized routing algorithm, and output a second notification to the invoking module;

the invoking module is configured to invoke a preset default routing algorithm to compute a service path when receiving the first notification; and invoke a customized routing algorithm function which is downloaded by using a universal invoking interface for a routing algorithm, and perform computation of the service path this time when receiving the second notification.

10. A software defined network Open Algorithm Function, SDN-OAF, comprising hardware performing instructions stored in a non-transitory computer readable medium which executes steps in following modules: a query module, a download processing module, and a customized routing algorithm storage module storing a pre-configured customized routing algorithm; wherein,     the query module is configured to receive a query request from an APP, decide a customized routing algorithm according to a requirement for current service establishment, and select the customized routing algorithm from the customized routing algorithm storage module, and return a URL address of the selected customized routing algorithm as information about the customized routing algorithm to the APP;

the download processing module is configured to receive a download request from an SDN controller, and acquire a corresponding library file from the customized routing algorithm storage module according to the URL address of the customized routing algorithm carried in the download request and return the corresponding library file to the SDN controller.

11. The SDN-OAF according to claim 10, further comprising hardware performing instructions stored in a non-transitory computer readable medium which executes steps in following modules:

a first authentication module, configured to, perform an authentication on a user of the APP requesting to query; and forward the query request to the query module when the authentication succeeds; and reject the query request this time when the authentication fails;

a second authentication module, configured to, perform an authentication on the SDN controller which initiates the download request, and forward the download request to the download processing module when the authentication succeeds; and reject the download request this time when the authentication fails.

12. A non-transitory computer-readable storage medium, storing computer-executable instructions, wherein the computer-executable instructions are used to execute the method of claim 1.

13. The method according to claim 4, wherein, before downloading the library file corresponding to the customized routing algorithm, the method further comprises:

the SDN-OAF performing an authentication on the SDN controller, and continuing to perform the step of downloading the library file corresponding to the customized routing algorithm when the authentication succeeds.

14. The method according to claim 4, wherein, after the SDN controller receives the path computation request from the application, APP, the method further comprises:

the SDN controller determining whether the path computation request carries the URL address of the customized routing algorithm, and when the URL address of the customized routing algorithm is not carried, invoking a preset default routing algorithm to compute the service path.

15. The method according to claim 4, wherein, when the SDN controller fails to download the library file corresponding to the customized routing algorithm from the SDN-OAF, the method further comprises:

the SDN controller invoking a preset default routing algorithm to compute the service path.

16. The method according to claim 4, wherein, after computing the service path, the method further comprises:

the SDN controller deleting or caching a library file of the customized routing algorithm which is acquired this time according to a setting.

\* \* \* \* \*